United States Patent
Hatcher et al.

(10) Patent No.: US 7,845,696 B2
(45) Date of Patent: Dec. 7, 2010

(54) WEED REMOVAL TOOL

(75) Inventors: Stephen D. Hatcher, Dillsburg, PA (US); Peter A. Arcati, Dillsburg, PA (US)

(73) Assignee: Ames True Temper, Inc., Camp Hill, PA (US)

( * ) Notice: Subject to any disclaimer, the term of this patent is extended or adjusted under 35 U.S.C. 154(b) by 326 days.

(21) Appl. No.: 12/115,120

(22) Filed: May 5, 2008

(65) Prior Publication Data

US 2009/0273198 A1  Nov. 5, 2009

(51) Int. Cl.
*A01B 1/16* (2006.01)
(52) U.S. Cl. .................. 294/50.5; 294/50.7; 294/61; 294/115
(58) Field of Classification Search ....... 294/50.5–50.8, 294/60, 61, 115; 172/378–380, 22
See application file for complete search history.

(56) References Cited

U.S. PATENT DOCUMENTS

| | | | |
|---|---|---|---|
| 654,904 A | 7/1900 | Marchant | |
| 1,039,012 A * | 9/1912 | Behrendt | 294/50.5 |
| 1,225,188 A | 5/1917 | Smith | |
| 1,328,063 A | 1/1920 | St. John | |
| 1,443,138 A | 1/1923 | Littley | |
| 1,455,144 A | 5/1923 | Moors | |
| 1,466,168 A | 8/1923 | Holton | |
| 1,501,965 A | 7/1924 | Moors | |
| 1,553,270 A | 9/1925 | Saffold | |
| 2,049,298 A | 7/1936 | Jung | |
| 3,050,327 A * | 8/1962 | Kuntz | 294/50.5 |
| 3,525,546 A * | 8/1970 | Lowell | 294/50.7 |
| 3,602,542 A | 8/1971 | Disston, Jr. | |
| 4,473,248 A | 9/1984 | Preradovich | |
| 4,603,744 A * | 8/1986 | Ramirez | 172/25 |
| 5,234,241 A | 8/1993 | Ikerd | |
| 5,261,496 A * | 11/1993 | Smotherman | 172/25 |
| 6,349,776 B1 * | 2/2002 | Hus | 172/375 |

* cited by examiner

*Primary Examiner*—Dean J Kramer
(74) *Attorney, Agent, or Firm*—Eckert Seamans Cherin & Mellott, LLC; David C. Jenkins, Esquire (57) ABSTRACT

A manually operable weed remover consists of a cluster of pivotable and rotatable spikes attached to a handle. When positioned over the center of a weed and downward pressure is applied, either by pushing on a bar handle or stepping on a foot rest, a bottom flange is forced up by the ground surface as the spikes are forced into the ground around the weed. The spikes are directed through apertures in the moveable flange and movement of the flange causes the spikes to close around the root of the weed. The insertion motion of the spikes further causes the spike mounting device to rotate relative to the handle and the weed. Thus, as the spikes are being inserted into the ground, the spikes rotate thereby separating the weed root from the adjacent ground. The weed may then be pulled from the ground by upward pressure on the tool.

20 Claims, 6 Drawing Sheets

WEED REMOVAL TOOL

BACKGROUND OF THE INVENTION

1. Field of the Invention

The present invention relates to garden tools and, more specifically, to a manually operable weed remover which utilizes pivotal and rotatable spikes to capture a weed and its attendant root structure.

2. Background Information

There are many types of garden tools which can be utilized to remove stubborn weeds from the lawn and garden. Most of these tools rely upon sharpened blades of one type or another where such blades are fixedly secured to a handle, and usually substantial manual effort is required to remove weeds. Further, these types of prior art garden tools are not particularly suited for removing weed root structures.

Accordingly, as set forth in U.S. Pat. No. 5,234,241, which is incorporated herein by reference, a weed removal tool is disclosed having a handle, an elongated shaft and a cluster of pivotable spikes attached to the lower end of the shaft/handle. When positioned over the center of a weed and downward pressure is applied, either by pushing on a bar handle or stepping on a foot rest, a bottom flange is forced up by the ground surface as the spikes pass through openings in the flange and into the ground around the weed. The spikes are directed through apertures in the moveable flange and movement of the flange causes the spikes to close around the root of the weed. The weed may then be pulled from the ground by upward pressure on the tool.

SUMMARY OF THE INVENTION

While the design of the weed removal tool set forth in U.S. Pat. No. 5,234,241 is satisfactory, removal of the weed may be made easier if an action of the weed removal tool further separated the dirt surrounding the weed's root from the root. Accordingly, the disclosed concept provides for a weed removal tool wherein a spike support assembly is rotatably coupled to the handle/shaft. The spike support assembly also includes an actuation rod that engages a helical cam slot on the shaft. The interaction of these components as the user presses the weed removal tool down over a weed cause the spikes to twist about the weed root and thereby separate the dirt surrounding the weed's root from the root.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, directional terms, such as, but not limited to, "upper," "lower," and "lateral" correspond to the orientation of the weed removal tool from the perspective of a user holding the tool. Such directional terms are not limiting upon the claims.

Figure 1:
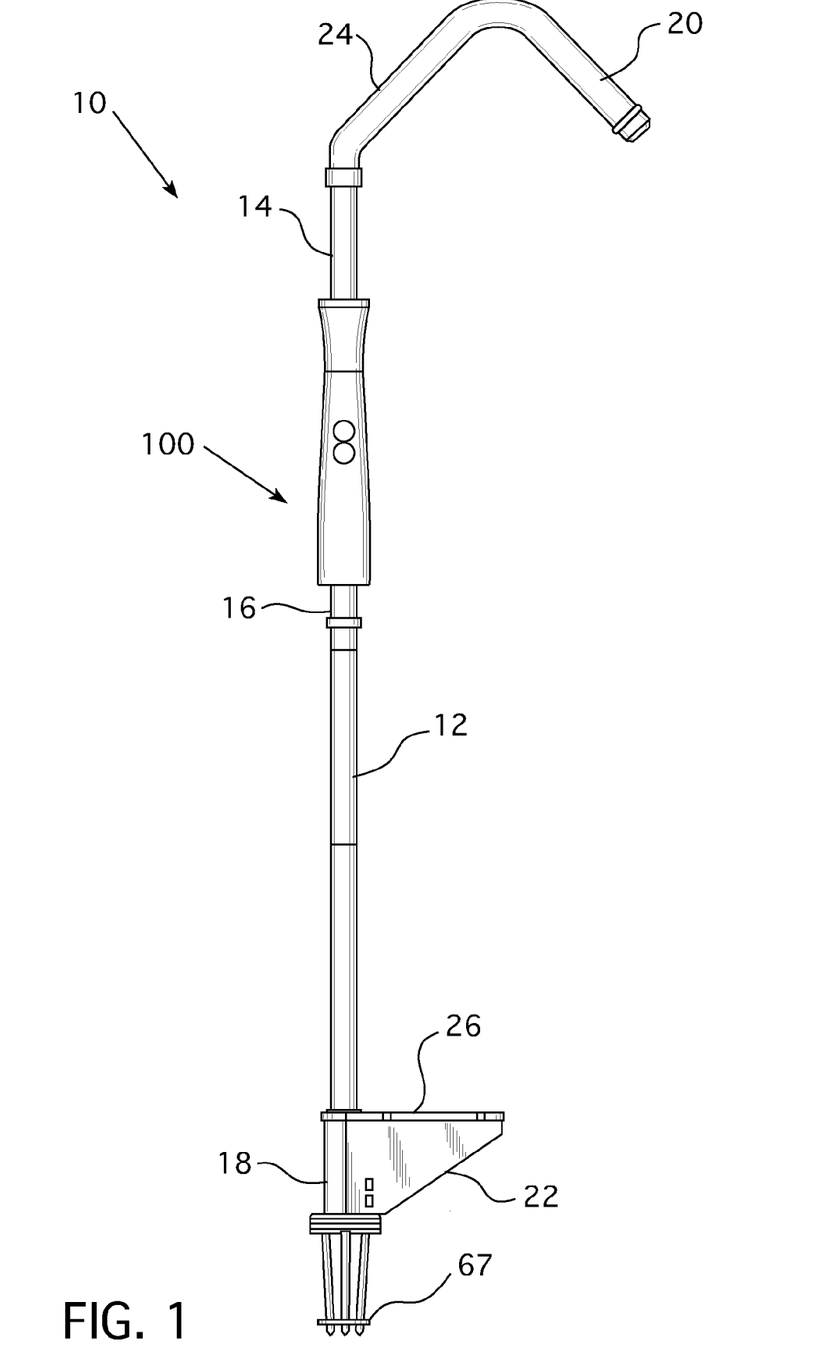
FIG. 1 is a side view of the weed removal tool.

As shown in FIG. 1, a weed removal tool 10 includes a long hollow tubular shaft 12 and a spike support assembly 50. The weed removal tool 10 may include a release assembly 100, which is preferably a slide hammer, as described below.

Figure 2:
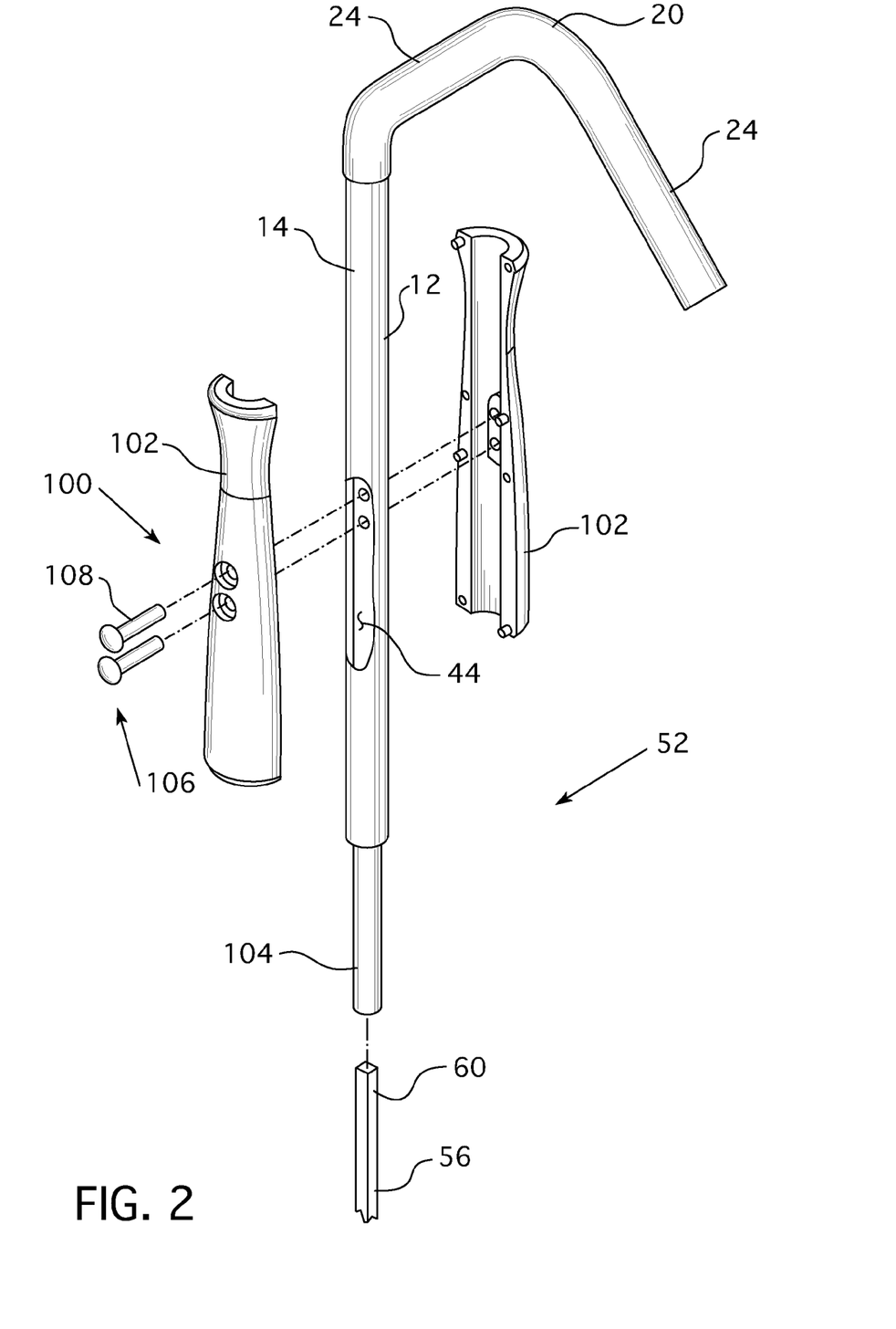
FIG. 2 is an exploded/cut away view of the upper portion of the weed removal tool.
Figure 3:
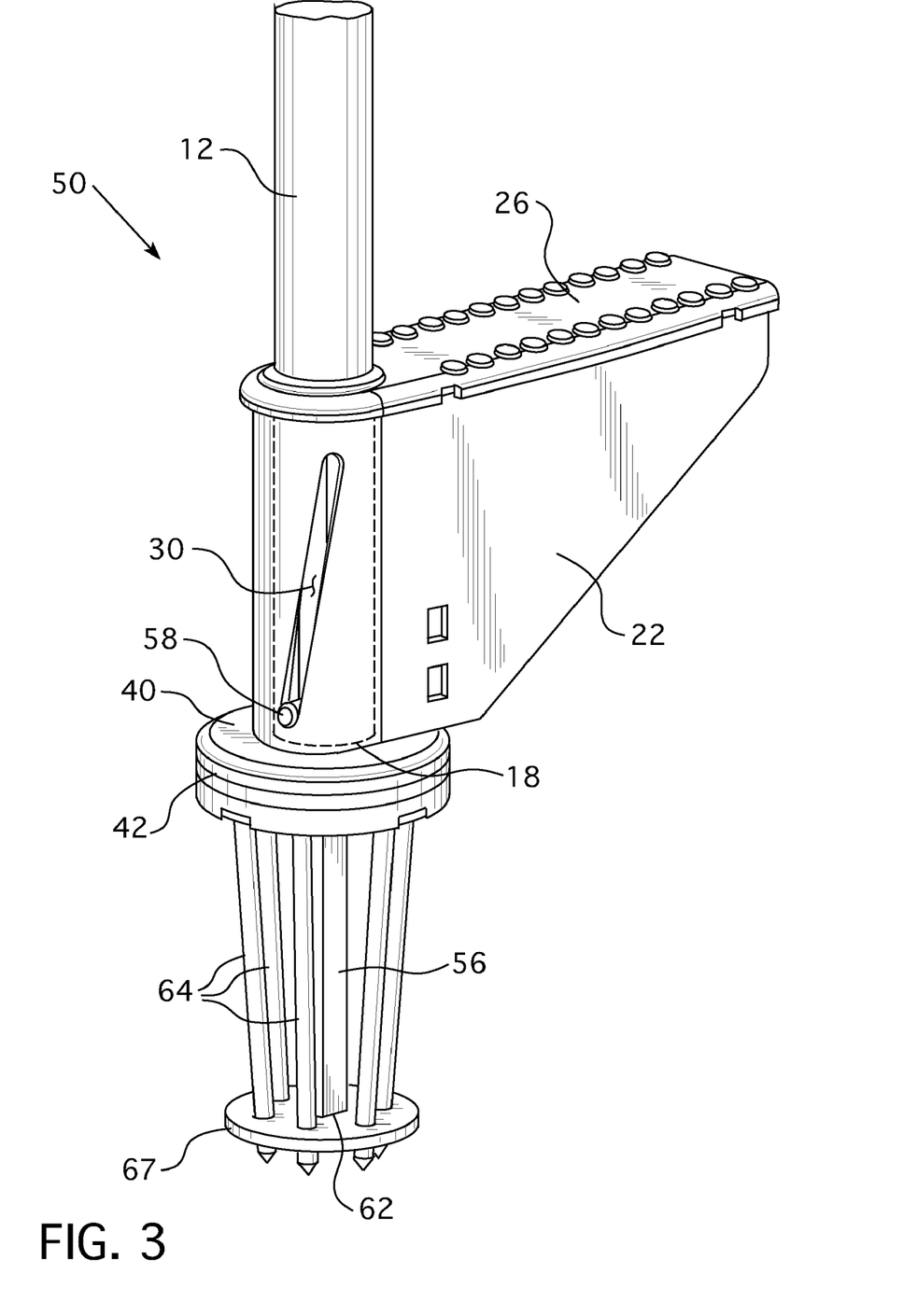
FIG. 3 is an isometric view of the lower portion of the weed removal tool.

The shaft 12 is generally circular and has an upper end 14, a medial portion 16 and a lower end 18. A handle assembly 20 is disposed at the shaft upper end 14 and a foot rest assembly 22 is disposed at the shaft lower end 18. As shown in FIG. 2, the handle assembly 20 preferably includes an ergonomic inverted "V" shaped grip 24. As shown in FIG. 3, the foot rest assembly 22 includes a radially extending platform 26 that is fixed to the shaft 12. The shaft lower end 18 also includes at least one, and preferably two, cam slots 30. The cam slots 30 extend at least partially helically over the shaft lower end 18. In the preferred embodiment, the cam slots 30 are helical and have a relatively steep pitch. For example, where the shaft 12 has a diameter of between about 0.5 and 1.0 inch and more preferably about 0.75 inch the cam slots 30 extend vertically between about 1.5 and 3.0 and more preferably about 2.75 inches while wrapping about 90 degrees over the shaft 12. In an alternate embodiment, shown in FIG. 4, the cam slots 30 have a generally straight lower portion 32 and a generally helical upper portion 34. The cam slots 30 cause the spike support assembly 50 to rotate as described below. The cam slots 30 are, preferably, disposed about 180 degrees apart on the shaft 12. The distal tip of the shaft lower end 18 may include a circular flange 40 with a descending sidewall 42 as described in detail below. The shaft medial portion 16 may include at least one longitudinal slot 44 as described in detail below.

Figure 5:
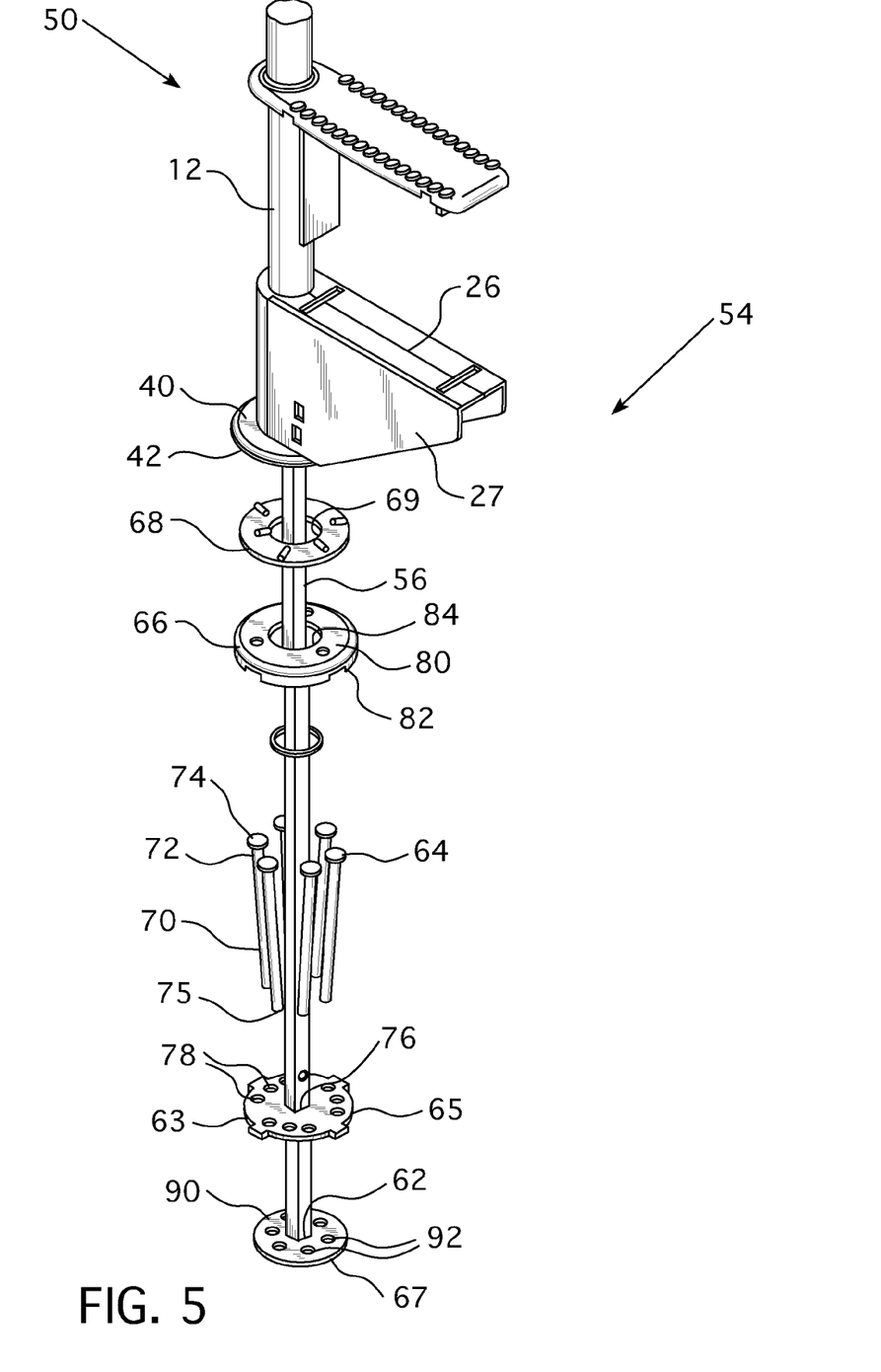
FIG. 5 is an exploded view of the spike support assembly.
Figure 6:
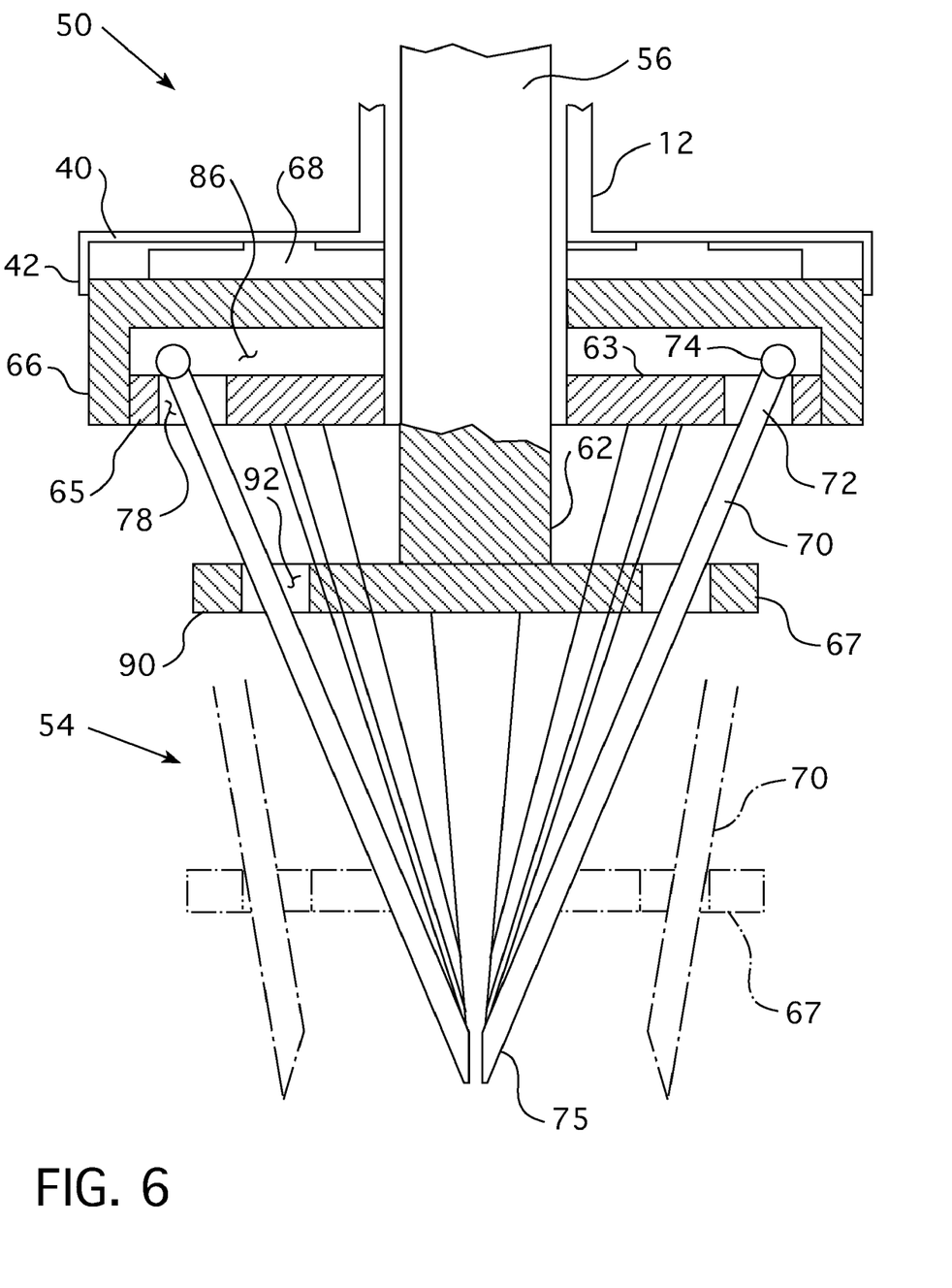
FIG. 6 is a cross-sectional side view showing the two positions of the spike support assembly.

As shown in FIGS. 5 and 6, the spike support assembly 50 includes an elongated inner rod assembly 52 and a spike assembly 54. The inner rod assembly 52 includes an elongated actuation rod 56 having an upper end 60 and a lower end 62. The inner rod assembly 52 may include a release assembly rod 104 as described below. The actuation rod 56 has a non-circular cross-section which is, preferably, square. The actuation rod 56 includes at least one, and preferably two, radially extending cam followers 58. The cam followers 58 are sized to be disposed within, and operatively engage the cam slots 30. The actuation rod 56 is movably disposed within the shaft 12 and is structured to move between a first, lower position and a second upper position.

The spike assembly 54 includes a plurality of spikes 64, a spike mounting plate 65, and a spike guide 67. The spike assembly 54, preferably, includes a spike mounting plate cap 66 and a bearing 68. In the preferred embodiment the spikes 64 are, essentially, nails having an elongated body 70 with a first end 72 having a head 74 and a pointed second end 75. Also in the preferred embodiment, the spike mounting plate 65 has a generally flat circular body 63 with a non-circular central opening 76 and a plurality of spike openings 78 therethrough. The central opening 76 is sized to allow the actuation rod 56 to pass therethrough, but is only slightly larger than the actuation rod 56. The spike openings 78 are disposed about the periphery of the spike mounting plate 65 at a first radius. The spike mounting plate cap 66 has a circular body 80 with an axially extending sidewall 82 and central opening 84 sized to allow the actuation rod 56 to pass therethrough without contacting the spike mounting plate cap 66. The spike mounting plate cap sidewall 82 is structured to be, and is, coupled to the spike mounting plate 65 thereby defining a plenum 86 between the spike mounting plate cap body 80 and the spike mounting plate 65. The spikes 64 are pivotally coupled to the spike mounting plate 65. That is, each spike head 74 is disposed in the plenum 86 with each spike body 70 extending through a spike opening 78. The optional bearing 68 has a central opening 69 sized to allow the actuation rod 56 to pass therethrough without contacting the bearing 68.

The spike guide 67, preferably, has a generally flat circular body 90 having a plurality of openings 92 sized to allow a spike 64 to pass therethrough. The spike guide openings 92 are disposed in a generally circular pattern, said spike guide openings 92 defining a circle with a second radius. The second radius is smaller than the first radius.

The spike assembly 54 is assembled and operates as follows. The actuation rod 56 extends through the spike mounting plate cap central opening 84 and the spike mounting plate non-circular central opening 76. The spike guide 67 is fixed to the distal tip of the actuation rod lower end 62 with the actuation rod 56 disposed at the center of the spike guide 67. The spikes 64 are further disposed through the spike guide openings 92, with just the tips of the spike second ends 75 extending past the spike guide 67. Because the spike guide openings 92 are at a smaller radius than the location where the spike first ends 72 are coupled to the spike mounting plate 65, the spikes 64 are angled toward the center of the spike guide 67. The spike mounting plate 65 is rotatably coupled to the shaft lower end 18, preferably to the circular flange descending sidewall 42. That is, the circular flange descending sidewall 42 has a diameter slightly greater than the diameter of the spike mounting plate 65 and the spike mounting plate 65 is rotatably disposed in the pocket defined by the circular flange 40 and its descending sidewall 42. The bearing 68 may be disposed between the spike mounting plate cap 66 and the shaft 12.

As noted above, the actuation rod 56 is movably disposed within the shaft 12 and is structured to move between a first, lower position and a second upper position. Thus, in this configuration, when the actuation rod 56 is in the first, lower position, the spike guide 67 is spaced from the shaft lower end 18 and the spikes 64 are generally spaced apart from each other. As the actuation rod 56 moves to the second upper position and the spike guide 67 moves closer to the spike mounting plate 65, the spikes 64, and more specifically the spike second ends 75, are drawn substantially together. It is this action that allows the weed removal tool 10 to grasp a weed, as described below. Thus, as shown in FIG. 5, the spike assembly 54 has a plurality of spikes 64 structured to pivot between a first, open position, wherein the spikes 64 are generally spaced apart from each other, and a second, closed position, wherein a portion of the spikes 64 are drawn substantially together.

The weed removal tool 10 is assembled and operates as follows. As noted above the spike assembly 54 is rotatably coupled to the shaft lower end 18. The actuation rod 56 is disposed within the shaft 12 with the cam followers 58 disposed within the cam slots 30. Initially, the actuation rod 56 and the spike assembly 54 are in their respective first positions. A user then places the weed removal tool 10 over a weed with the weed centrally disposed below the spike guide 67. The user holds onto the handle assembly 20 and substantially maintains the orientation of the shaft 12 relative to the user. That is, the user does not allow the shaft 12 to rotate substantially. As the user moves the weed removal tool 10 downwardly, the spike second ends 75 engage the ground in a circular pattern about the weed. When the spike guide 67 engages the ground, or more specifically, crushes the weed against the ground, the spike guide 67, essentially, becomes vertically fixed. That is, the spike guide 67 cannot move downwardly.

Thus, as the user continues to move the shaft 12 towards the ground, preferably using the foot rest assembly 22 to apply additional force, the following happens. First, because the spike assembly 54 is rotatably coupled to the shaft 12, the spikes 64 move vertically downwardly with the shaft 12. Thus, the spikes 64 begin to move through the spike guide openings 92 as the spike guide 67 cannot move downwardly. As the spikes 64 move through the spike guide openings 92, the spikes 64 dig into the ground. Also, as described above, as the spike guide 67 moves toward the spike mounting plate 65, the spikes 64, and more specifically the spike second ends 75, are drawn substantially together.

At the same time, and because the actuation rod 56 is fixed to the spike guide 67, when the spike guide 67 becomes, essentially, vertically fixed, the shaft 12 moves vertically relative to the actuation rod 56. As the actuation rod 56 has cam followers 58 disposed in the cam slots 30 on the shaft 12, the actuation rod 56 is forced to rotate. That is, as the cam followers 58 travel through the helical cam slots 30, the actuation rod 56, and therefore the spike guide 67, are forced to rotate relative to the shaft. Further, because the spike mounting plate 65 is rotatably coupled to the shaft 12, the spike mounting plate 65 and the spikes 64 also rotate relative to the shaft 12. Further, because the actuation rod 56 is non-circular and passes through the spike mounting plate non-circular central opening 76 and because the spike mounting plate non-circular central opening 76 is only slightly larger than the actuation rod 56, the rotation of the actuation rod 56 is also transmitted to the spike mounting plate 65 via this interface as well. Thus, as the spike assembly 54 moves to the second position, the spike assembly 54 also rotates relative to the shaft 12. Thus, the spike assembly 54 both grasps and twists the weed, thereby allowing for easy removal of the weed.

Figure 4:
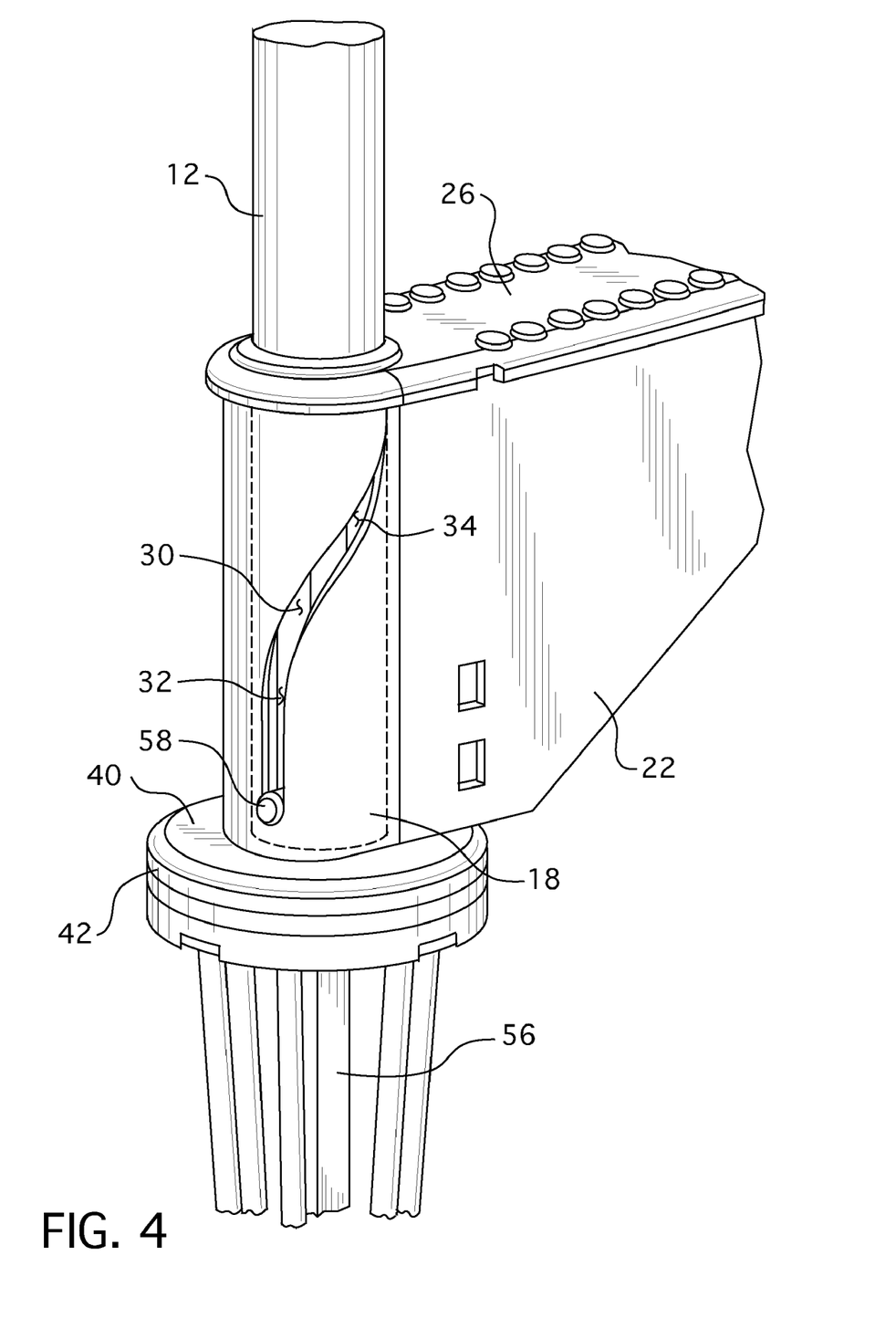
FIG. 4 is an isometric view of the lower portion of an alternate embodiment of the weed removal tool.

It is noted that in the alternate embodiment shown in FIG. 4, when the cam followers 58 are disposed in the generally straight lower portion 32 of the cam slots 30, the actuation rod 56 maintains its orientation relative to the shaft 12, thereby allowing the spikes 64 to initially dig straight into the ground. However, when the cam followers 58 are disposed in the generally helical upper portion 34 of the cam slots 30, the engagement of the cam followers 58 within the generally helical upper portion 34 of the cam slots 30 causes the actuation rod 56 to rotate relative to the shaft 12.

As set forth in U.S. Pat. No. 5,234,241, the actuation rod 56 may extend past the top of the shaft 12. Thus, the actuation rod 56, as well as the spike assembly 54, may be returned to the first position by pressing on the exposed top of the actuation rod 56. However, the preferred embodiment includes a release assembly 100. As shown in FIG. 2, the release assembly 100 includes a external handle 102 and the release assembly rod 104, noted above. The release assembly rod 104 is disposed within the shaft 12 at a location above the actuation rod 56 and may move longitudinally therein between an upper position and lower position. The external handle 102 is structured to move said release assembly rod 104 from the upper position to the lower position.

That is, the external handle 102 is a tubular member sized to be disposed about the shaft medial portion 16 and has at least one inwardly extending coupling 106 structured to engage the release assembly rod 104. The external handle coupling 106 extends through the shaft medial portion 16 at least one longitudinal slot 44 and is coupled to the release assembly rod 104. Preferably, the shaft medial portion 16 includes two longitudinal slots 44 disposed about 180 degrees apart on the shaft 12. Further, the external handle coupling 106 is preferably at least one rod 108 extending through the release assembly rod 104 and through both the longitudinal slots 44. The external handle 102 may be weighted. The lower end of the release assembly rod 104 engages the upper end of the actuation rod 56.

In this configuration, as a user pulls a weed, the actuation rod 56 moves the release assembly rod 104 into the upper position. Thus, after a user has pulled a weed, the user may grasp the external handle 102 and move the external handle 102 towards the shaft lower end 18; this causes the release assembly rod 104 to move downwardly and into the actuation rod 56. As the release assembly rod 104 is move into the lower position, the actuation rod 56 is returned to the first lower position and the spike assembly 54 is returned to the first position, thereby releasing the weed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A weed removal tool comprising:
a hollow shaft having an upper end and a lower end;
a spike support assembly having a spike assembly and an inner rod assembly;
said spike support assembly having a plurality of spikes structured to pivot between a first, open position, wherein the spikes are generally spaced apart from each other, and a second, closed position, wherein a portion of the spikes are drawn substantially together;
said spike support assembly being rotatably coupled to said shaft lower end;
said inner rod assembly having an elongated actuation rod, said actuation rod movably disposed within said shaft and structured to move between a first, lower position and a second upper position;
said actuation rod coupled to said shaft and to said spike support assembly and structured to cause said spike support assembly to rotate and to move between said spike support assembly first, open position and said spike support assembly second, closed position;
said shaft lower end has at least one cam slot;
said at least one cam slot extending at least partially helically over said shaft lower end;
said actuation rod engaging said cam slot;
wherein, as said actuation rod moves between said actuation rod first and second positions, said actuation rod rotates in response to the engagement with said at least one cam slot, said rotation of said actuation rod further causing said spike support assembly to rotate; and
said at least one cam slot includes a generally straight lower portion and a generally helical upper portion.

2. A weed removal tool comprising:
a hollow shaft having an upper end and a lower end;
a spike support assembly having a spike assembly and an inner rod assembly;
said spike support assembly having a plurality of spikes structured to pivot
between a first, open position, wherein the spikes are generally spaced apart from each other, and a second, closed position, wherein a portion of the spikes are drawn substantially together;
said spike support assembly being rotatably coupled to said shaft lower end;
said inner rod assembly having an elongated actuation rod, said actuation rod movably disposed within said shaft and structured to move between a first, lower position and a second upper position;
said actuation rod coupled to said shaft and to said spike support assembly and structured to cause said spike support assembly to rotate and to move between said spike support assembly first, open position and said spike support assembly second, closed position;
said shaft lower end has at least one cam slot;
said at least one cam slot extending at least partially helically over said shaft lower end;
said actuation rod engaging said cam slot;
wherein, as said actuation rod moves between said actuation rod first and second positions, said actuation rod rotates in response to the engagement with said at least one cam slot, said rotation of said actuation rod further causing said spike support assembly to rotate; and
said at least one cam slot is generally helical.

3. The weed removal tool of claim 2 wherein:
said actuation rod having at least one radially extending cam follower; and
said actuation rod disposed within said shaft with said at least one cam follower disposed in said cam slot.

4. The weed removal tool of claim 3 wherein:
said shaft is generally circular;
said at least one cam slot includes two cam slots, said cam slots disposed about 180 degrees apart on said shaft;
said at least one radially extending cam follower includes two said cam followers disposed about 180 degrees apart on said actuation rod; and
wherein each cam follower engages one cam slot.

5. The weed removal tool of claim 4 wherein:
said actuation rod has a non-circular cross-section;
said spike support assembly has a non-circular opening structured to allow said actuation rod to pass therethrough, said non-circular opening sized to be slightly larger than said actuation rod; and
whereby rotation of said actuation rod causes said actuation rod to engage said spike support assembly opening and rotate said spike support assembly.

6. A weed removal tool comprising:
a hollow shaft having an upper end, a medial portion and a lower end;
a spike support assembly having a spike assembly and an inner rod assembly;
said spike support assembly having a plurality of spikes structured to pivot between a first, open position, wherein the spikes are generally spaced apart from each other, and a second, closed position, wherein a portion of the spikes are drawn substantially together;

said spike support assembly being rotatably coupled to said shaft lower end;

said inner rod assembly having an elongated actuation rod and a release assembly rod;

said actuation rod movably disposed within said shaft and structured to move between a first, lower position and a second upper position;

said actuation rod coupled to said shaft and to said spike support assembly and structured to cause said spike support assembly to rotate and to move between said spike support assembly first, open position and said spike support assembly second, closed position;

said release assembly rod disposed within said shaft above said actuation rod, said release assembly rod structured to move between an upper position and a lower position;

a release assembly having an external handle, said release assembly handle coupled to said release assembly rod, said release assembly handle structured to move said release assembly rod from said upper position to said lower position; and wherein, when said release assembly rod is moved from said upper position to said lower position, said release assembly rod engages said actuation rod and moves said actuation rod from said second upper position to said first lower position.

7. The weed removal tool of claim 6 wherein:
said shaft lower end has at least one cam slot;
said at least one cam slot extending at least partially helically over said shaft lower end;
said actuation rod engaging said cam slot; and
wherein, as said actuation rod moves between said actuation rod first and second positions, said actuation rod rotates in response to the engagement with said at least one cam slot, said rotation of said actuation rod further causing said spike support assembly to rotate.

8. The weed removal tool of claim 7 wherein said at least one cam slot includes a generally straight lower portion and a generally helical upper portion.

9. The weed removal tool of claim 8 wherein said at least one cam slot is generally helical.

10. The weed removal tool of claim 8 wherein:
said actuation rod having at least one radially extending cam follower; and
said actuation rod disposed within said shaft with said at least one cam follower disposed in said cam slot.

11. The weed removal tool of claim 10 wherein:
said shaft is generally circular;
said at least one cam slot includes two cam slots, said cam slots disposed about 180 degrees apart on said shaft;
said at least one radially extending cam follower includes two said cam followers disposed about 180 degrees apart on said actuation rod; and
wherein each cam follower engages one cam slot.

12. The weed removal tool of claim 11 wherein:
said actuation rod has a non-circular cross-section;
said spike support assembly has a non-circular opening structured to allow said actuation rod to pass therethrough, said non-circular opening sized to be slightly larger than said actuation rod;
whereby rotation of said actuation rod causes said actuation rod to engage said spike support assembly opening and rotate said spike support assembly.

13. The weed removal tool of claim 12 wherein:
said shaft medial portion includes at least one longitudinal slot;
said release assembly handle being a tubular member sized to be disposed about said shaft medial portion and having at least one inwardly extending coupling structured to engage said release assembly rod; and said release assembly handle being disposed about said shaft medial portion with said at least one inwardly extending coupling extending through said at least one longitudinal slot and being coupled to said release assembly rod.

14. The weed removal tool of claim 13 wherein:
said shaft medial portion includes two longitudinal slots, said longitudinal slots being disposed about 180 degrees apart on said shaft medial portion; and
said release assembly handle inwardly extending coupling being at least one rod extending through said release assembly rod and through both said longitudinal slots.

15. The weed removal tool of claim 14 wherein:
said actuation rod has an upper end and a lower end;
said spike assembly having a plurality of spikes, a spike mounting plate, and a spike guide;
said spike mounting plate having a central non-circular opening sized to allow said actuation rod to pass therethrough;
said spike mounting plate being rotatably coupled to said shaft lower end;
said spike guide having a plurality of openings sized to allow a spike to pass therethrough;
said spike guide fixed to said actuation rod lower end;
each said spike having an elongated body with a first end and a second end, each said spike first end pivotally coupled to said spike mounting plate, each said spike extending through an associated opening on said spike guide;
wherein, when said actuation rod is in said first, lower position, said spike support assembly is in said first, open position, and when said actuation rod is in said second, upper position, said spike support assembly is in said second, closed position.

16. The weed removal tool of claim 15 wherein:
said spike mounting plate is generally circular and said spikes are pivotally coupled to said spike mounting plate adjacent to the periphery of said spike mounting plate at a first radius;
said spike guide openings are disposed in a generally circular pattern defining a circle with a second radius; and
wherein said second radius is smaller than said first radius.

17. The weed removal tool of claim 16 wherein:
each said spike body includes a head at said first end;
said spike mounting plate having a plurality of spike openings therethrough;
said spike support assembly includes a spike mounting plate cap;
said spike mounting plate cap having a circular body with an axially extending sidewall and central opening sized to allow said actuation rod to pass therethrough;
said spike mounting plate cap sidewall structured to be coupled to said spike mounting plate thereby defining a plenum between said spike mounting plate cap body and said spike mounting plate; and
each said spike head disposed within said plenum with each said spike body extending through a spike mounting plate opening.

18. The weed removal tool of claim 17 wherein:
said shaft lower end has a circular flange with a descending sidewall, said circular flange sized to be slightly larger than said spike mounting plate;
said spike support assembly includes a bearing with a central opening sized to allow said actuation rod to pass therethrough;

said spike assembly bearing disposed between said shaft lower end flange and said spike mounting plate cap; and said spike mounting plate rotatably coupled to said shaft lower end flange descending sidewall.

19. The weed removal tool of claim 6 wherein:

said shaft medial portion includes at least one longitudinal slot;

said release assembly handle being a tubular member sized to be disposed about said shaft medial portion and having at least one inwardly extending coupling structured to engage said release assembly rod; and said release assembly handle being disposed about said shaft medial portion with said at least one inwardly extending coupling extending through said at least one longitudinal slot and being coupled to said release assembly rod.

20. The weed removal tool of claim 19 wherein:

said shaft medial portion includes two longitudinal slots, said longitudinal slots being disposed about 180 degrees apart on said shaft medial portion; and said release assembly handle inwardly extending coupling being at least one rod extending through said release assembly rod and through both said longitudinal slots.

* * * * *